March 17, 1959     E. M. BARNETTE, JR     2,877,828
FOLDING FISHERMAN'S SEAT
Filed July 22, 1958                           2 Sheets-Sheet 1
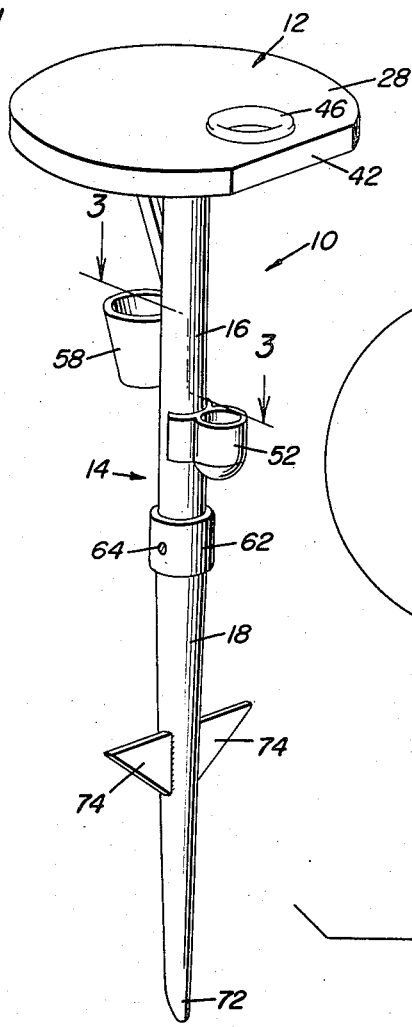
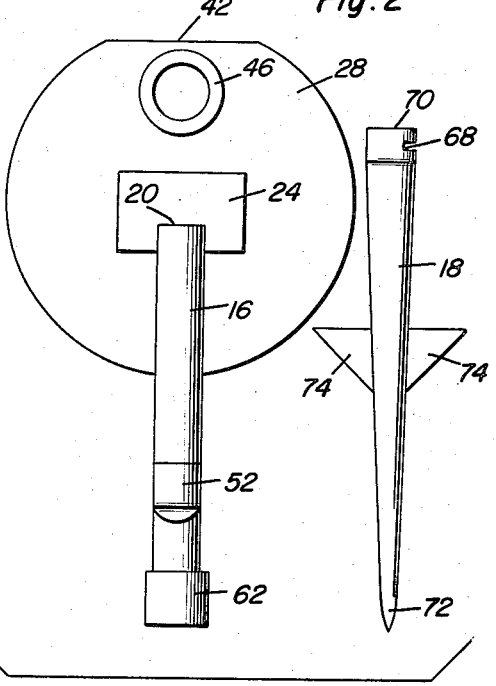
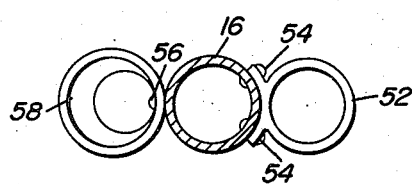
Ernest M. Barnette, Jr.
INVENTOR.
BY *Clarence A. O'Brien and Harvey B. Jacobson*
Attorneys March 17, 1959 E. M. BARNETTE, JR 2,877,828
FOLDING FISHERMAN'S SEAT
Filed July 22, 1958 2 Sheets-Sheet 2
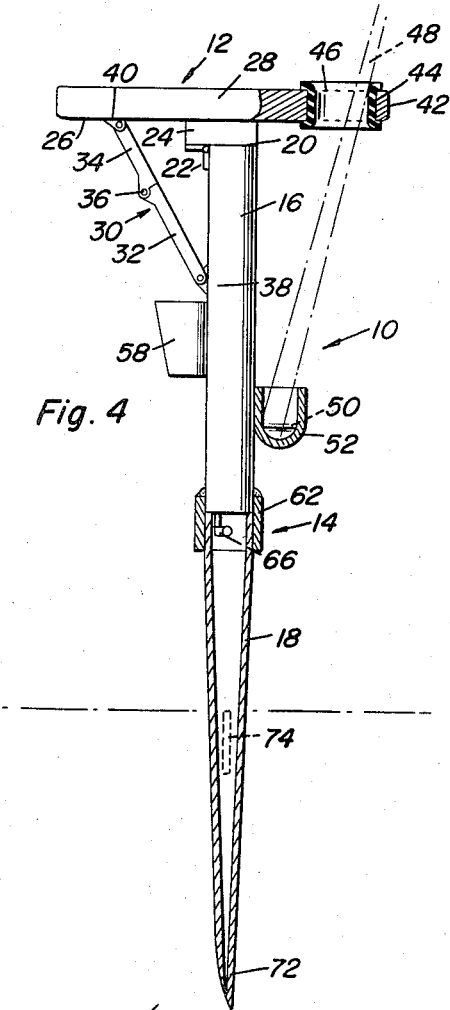
Fig. 4
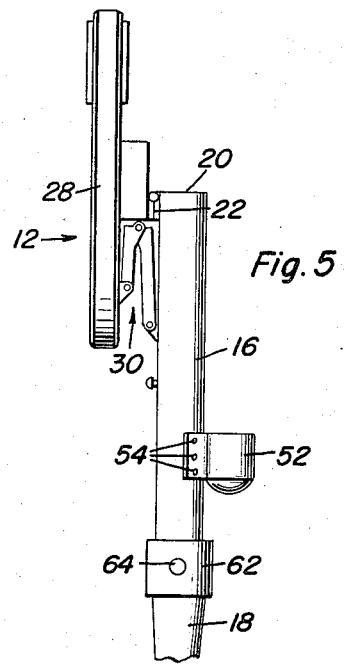
Fig. 5
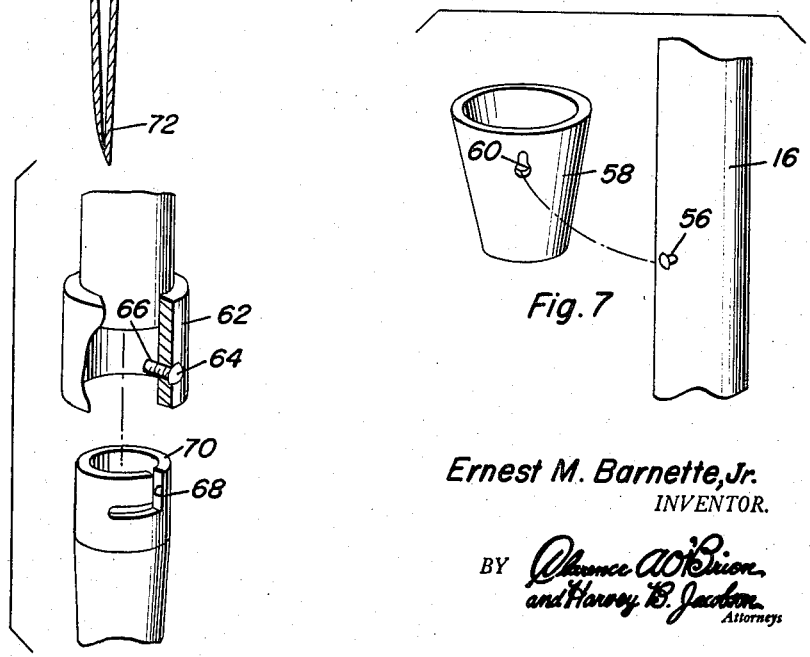
Fig. 6
Fig. 7
Ernest M. Barnette, Jr.
INVENTOR.
BY *Clarence A. O'Brien*
*and Harvey B. Jacobson*
Attorneys

United States Patent Office 2,877,828
Patented Mar. 17, 1959

2,877,828
FOLDING FISHERMAN'S SEAT

Ernest M. Barnette, Jr., Compton, Calif.

Application July 22, 1958, Serial No. 750,555

2 Claims. (Cl. 155—135)

This invention relates generally to a combined support stool, and is more particularly concerned with a combined stool and fishing rod support adapted to be used while fishing on the shore, said stool being readily collapsible and foldable whereby it may be readily transported and stored.

A more particular object of invention in conformance with that set forth above is to provide a readily collapsible support staff including a detachable lower portion having means for readily penetrating earth or sand, rendering the support staff stable, and including an upper end portion having an integral rod support cup, and pivotally supporting adjacent the upper end thereof a foldable seat which includes an aperture portion through which a fishing rod may be extended.

Other objects of invention are relative simplicity of construction and use, ease and efficiency of operation and general adaptability to various consistencies of soil.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the novel folding seat;

Figure 2 is a side elevational view of the folding seat with the lower end portion removed therefrom, and the seat being folded adjacent the upper portion of the support staff;

Figure 3 is a sectional view taken substantially on line 3—3 of Figure 1;

Figure 4 is a side elevational view of the folding seat with parts broken away and in section for clarity;

Figure 5 is a fragmentary side elevational view showing the seat folded adjacent the upper portion of the support staff;

Figure 6 is an exploded perspective view with parts broken away and showing the connection between the upper and lower portions of the support staff; and Figure 7 is a perspective view showing the manner of attachability of a bait cup on the support staff.

Indicated generally at 10 is a support seat which includes a seat portion 12 and a support staff assembly 14.

The support staff assembly 14 includes an upper portion 16 and a lower portion 18, the upper portion 16 has secured adjacent the upper edge 20 thereof a hinge element 22 which is also secured in any suitable manner to a support block 24 which is secured to the undersurface 26 of a seat 28. A snap hinge element 30 including pivot links 32 and 34 are pivoted together as at 36, the opposite end of the pivot links 32 and 34 being pivotally connected to suitable connecting ears 38 and 40 integrally secured on portions respectively faced downwardly and outwardly of the hinge 22 connecting the seat adjacent the top edge portion 20 of the support staff. As is seen in Figures 4 and 5 the seat may be readily pivoted on the hinge 22 and the snap hinge element 30 and readily folded as seen in Figure 5.

The seat element 28 includes adjacent an extreme edge portion 42 an aperture portion 44 which includes therein a resilient collar or insert element 46 which prevents chafing or damage to the fish pole indicated at 48. The lower end 50 of the fish pole 48 is rested in an upwardly opening cup element 52 which is adjacent the support staff portion 16 by means of suitable rivet elements 54, for example. Disposed on an opposite side portion of the staff portion 16 is an enlarged headed pivot element 26 which removably supports a bait cup 58 by means of a keyhole slot portion 60 extending through the side portion thereof. The lower end of the support staff 16 includes a tubular collar element 62 secured thereon in any suitable manner and which includes an inwardly directed bayonet pin 64 having an end portion 66 which is removably received in a bayonet slot portion 68 contained in and extending from an upper edge portion 70 of the bottom portion 18 of the support staff, a portion in which the bayonet slot is located being received in the annular collar portion 63 of the upper staff portion 16. The lower end portion 18 of the support staff member is suitably pointed as seen at 72 to provide the ready penetration of the support staff in the ground, sand, etc., and includes extending outwardly therefrom in spaced upper relation a pair of oppositely disposed stabilizing plates 74 which prevent the shifting of the staff member in the ground in which the support staff has been inserted.

Thus it is believed readily apparent that there has been disclosed a foldable or collapsible fishing seat which provides a great degree of comfort to the user, is available for playing the fish that has been caught and which readily conforms with the objects of invention heretofore set forth.

Various positional directional terms such as "front," "rear," "top," etc., are utilized herein to have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A collapsible fishing seat comprising a support staff, a seat member, a hinge element secured adjacent the side portion of said staff member adjacent a top edge portion thereof, said hinge element being secured on a lower surface portion of said seat for permitting the seat to be pivoted into overlying relationship to the top end of said staff or adjacent the side thereof, a snap hinge element including a pair of hinged links hinged together at one end, each of said links having an end portion pivotally secured to respective portions of the seat member and support staff in spaced relation to the hinge connected thereto, said seat including an aperture portion therein on the side opposite to that which the pivot link is pivotally secured, a socket cup secured on a lower portion of said staff member for receiving the end of a fishing rod extending through the aperture portion in said seat, and a removable bait cup secured on said support staff.

2. A collapsible fishing seat as set forth in claim 1 with said aperture portion in said seat including a resilient annular insert therein for protecting fishing rod from chafing and damage while fish having been caught are being played.

References Cited in the file of this patent
UNITED STATES PATENTS

| | | |
|---|---|---|
| 2,567,595 | Bryant | Sept. 11, 1951 |
| 2,607,368 | Andrews | Aug. 19, 1952 |